C. A. EDLUND, DEC'D.
H. EDLUND, ADMINISTRATRIX & J. DORAN, ADMINISTRATOR DE BONIS NON.
FLEXIBLE NECK BEARING FOR CENTRIFUGAL SEPARATORS.
APPLICATION FILED DEC. 22, 1906.
902,282.                                    Patented Oct. 27, 1908.
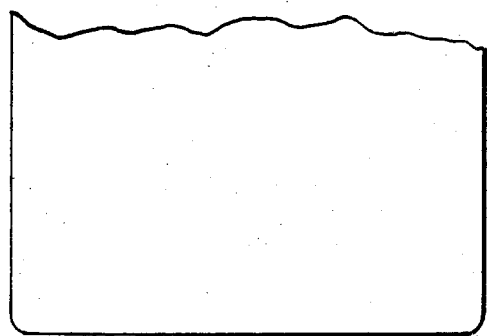
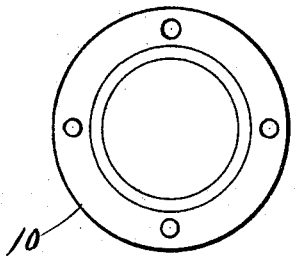
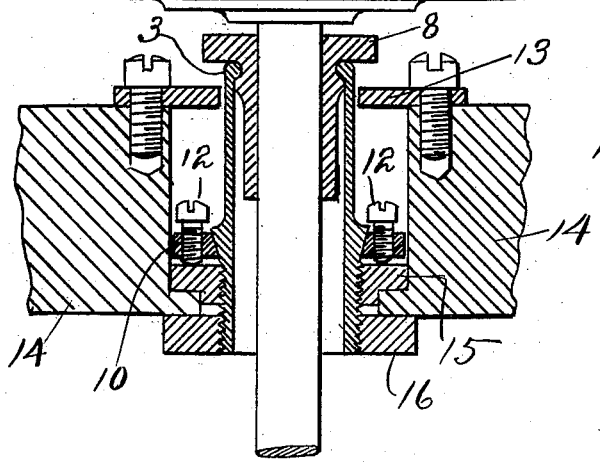
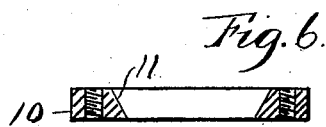
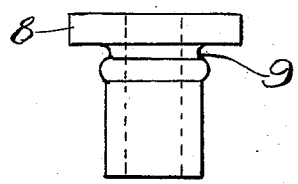
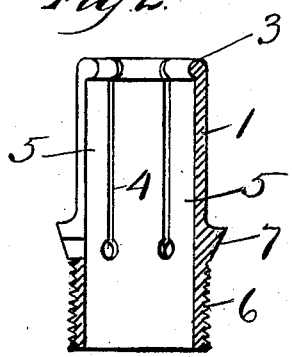
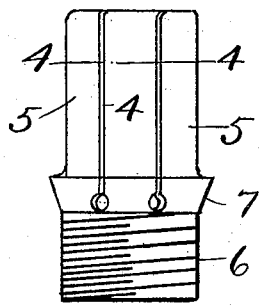
Witnesses
Frank A. Foster
E. I. Ogden
Hanna Edlund.
Administratrix of Estate of
Claus A. Edlund.
By Howard E. Barlow
Attorney

UNITED STATES PATENT OFFICE.

HANNA EDLUND, OF PROVIDENCE, RHODE ISLAND, ADMINISTRATRIX OF CLAUS A. EDLUND, DECEASED; JOHN DORAN, ADMINISTRATOR DE BONIS NON OF SAID CLAUS A. EDLUND, DECEASED, ASSIGNOR OF ONE-HALF TO EMIL BERNSTROM, OF PROVIDENCE, RHODE ISLAND.

FLEXIBLE NECK-BEARING FOR CENTRIFUGAL SEPARATORS.

No. 902,282.　　　　Specification of Letters Patent.　　　　Patented Oct. 27, 1908.

Application filed December 22, 1906. Serial No. 349,022.

*To all whom it may concern:*

Be it known that I, HANNA EDLUND, a citizen of the United States, residing at Providence, in the county of Providence and State of Rhode Island, hereby make application for patent for certain new and useful Improvements in Flexible Neck-Bearings for Centrifugal Separators, of which the following is a specification, reference being had therein to the accompanying drawing.

This invention relates to spring neck bearings for centrifugal separators and has for its object to provide a flexible bearing to engage the speed spindle and support the bowl, which necessarily rotates at a great velocity, giving said bowl the necessary amount of elasticity so that it will automatically find its own balancing center point.

Another and very essential feature of this invention is to reduce to a minimum the possibility of danger should any of the flexible portions of this bearing become broken or injured. It is well known to those skilled in the art to which this invention appertains, first, that the application of a flexible neck bearing to the rapidly revoluble bowl of a cream separator is of utmost importance to the successful operation of the same, and second, that if this flexible bearing should give way and allow the bowl to become loose and fly out great damage may be done and even the loss of life may result. In the construction of the present invention all of the above important features have been carefully considered with a result that all of the requirements of the device have been fully met.

The invention consists of other novel features as will be fully described hereinafter and then pointed out in the appended claims.

A practical embodiment of the invention is represented in the accompanying drawings, forming a part of this specification, in which similar characters of reference indicate corresponding parts in all the views.

In the drawings: Figure 1—is an elevation showing my improved device in section supporting the separator bowl. Fig. 2—is a detail of the spring neck bearing sectioned on line 2—2 of Fig. 4. Fig. 3—is a side elevation of said bearing. Fig. 4—is a section of said bearing on line 4—4 of Fig. 3. Fig. 5—is a plan view of the spring regulating bearing collar. Fig. 6—is a detail sectional view of the same. Fig. 7—is a detail of the bearing collar.

In the formation of my improved neck bearing 1 I have employed a piece of steel which has been made into a tubular form as best illustrated in Fig. 2, having an internally rounded bead 3 at its upper edge. The tube is then split or slotted as at 4 down a portion of its length from its upper edge thus forming a plurality of spring fingers 5—5. The lower end of this tube is externally threaded at 6, and above the threaded portion is an outwardly beveled shoulder 7. This neck bearing is preferably held in the framework 14 of the machine by means of the screw collar 15 and the check nut 16. Inserted into the upper end of this spring tube is the bearing collar 8 which collar is held in place by the bead 3 on the spring fingers which enter the grooved out portion 9 under the flange of the collar.

In order to regulate the tension of the spring fingers on the bearing a collar 10 has been provided to engage the inclined portion of the shoulder 7, this collar is also provided with a correspondingly beveled opening as at 11 and adapted to engage said inclined surface 7, and the regulating screws 12—12 may be set down to raise said collar 10 and thereby set the spring fingers 5—5 harder together, or said screws may be slackened up to release the tension on the same as desired. A very important feature of this spring neck bearing is the safety ring 13 that incloses the upper end of these springs.

It is well known by those skilled in the use of separators that if the neck bearing breaks and the bowl gets away great damage is apt to result, therefore this bearing is composed of a plurality of spring fingers so that if one, or even two, spring fingers should break there would still be enough left to safely retain the bowl spindle, and as a still further precaution the safety ring has been provided to hold the fingers in place and not even allow them to fall out of their required position even if one or more of them should happen to break, thus it will be seen that almost absolute safety is assured against breakage at this the most dangerous point in the machine.

The device is extremely simple and practical in construction, efficient in its operation and inexpensive to manufacture. The tension, and therefore the elasticity, of the bearing may be readily adjusted to meet the requirements under which the same may be operated.

Having thus described my invention, what I claim as new and desire to secure by Letters Patent, is:

1. A flexible neck bearing for centrifugal separators comprising a tubular body portion, there being a plurality of spring fingers formed in said body, a bearing collar retained in the grip of said fingers, means for regulating the spring tension of said fingers on said collar, and means inclosing said spring fingers to retain the same in position in case one or more become broken.

2. A flexible neck bearing, comprising a tubular body there being a plurality of spring fingers formed in said body, a bearing collar provided with a groove around its outer surface, there being means in the free ends of said fingers for engaging the groove in said collar to retain the same in position, and means for regulating the spring tension of said fingers on said collar.

3. A flexible neck bearing comprising a tubular body there being a plurality of spring fingers formed in said body, a bearing collar, there being means in the free ends of said fingers for engaging and retaining said bearing collar, means for regulating the spring tension of said fingers on said collar, and means inclosing said spring fingers to retain the same in position in case one or more of said fingers become broken.

4. A neck bearing for centrifugal separators comprising a tubular body portion, said body being provided with slots cut inward from one end thereof forming a plurality of flexible fingers in said tube, a bearing collar, there being means in the free ends of said fingers for engaging and retaining said bearing collar, and an inclined portion on the exterior of the tube at the base of the fingers, a plate adapted to engage said inclined portion, and means for adjusting said plate to regulate the tension on the spring fingers.

5. A neck bearing for centrifugal separators comprising a tubular body portion, said body being provided with slots cut inward from one end thereof, the metal between said slots forming a plurality of flexible fingers around said tube, a bearing collar provided with a groove around its outer surface, there being a bead formed on the ends of said fingers for engaging the groove in said collar to retain the same in position, and a safety ring inclosing said fingers to retain the same in position if broken.

6. A neck bearing for centrifugal separators comprising a tubular body portion, said body being provided with slots cut inward from one end thereof, the metal between said slots forming a plurality of flexible fingers around said tube, a bearing collar provided with a groove around its outer surface, there being a bead formed on the ends of said fingers for engaging the groove in said collar to retain the same in position, and an inclined portion on said fingers, a plate adapted to engage said inclined portion, means for adjusting said plate to regulate the tension of said fingers, and a safety ring inclosing said fingers to retain the same in position if broken.

7. A flexible neck bearing comprising a tubular body there being a plurality of spring fingers formed integral with said body, a bearing collar, there being means in the free ends of said fingers for engaging and retaining said bearing collar, adjustable means for regulating the spring tension of said fingers on said collar, and a safety ring inclosing said spring fingers to retain the same in position in case one or more of said fingers become broken.

In testimony whereof I affix my signature in presence of two witnesses.

HANNA EDLUND,
*Administratrix of the estate of Claus A. Edlund.*

Witnesses:
JOHN ERIKSON,
HOWARD E. BARLOW.